United States Patent
Lewis et al.

(10) Patent No.: US 9,154,815 B2
(45) Date of Patent: Oct. 6, 2015

(54) METHOD AND SYSTEM FOR SECURING MULTIMEDIA DATA STREAMED OVER A NETWORK

(75) Inventors: Jason E. Lewis, Issaquah, WA (US); Ryan D. Christianson, Lynnwood, WA (US)

(73) Assignee: Disney Enterprises, Inc., Burbank, CA (US)

(*) Notice: Subject to any disclaimer, the term of this patent is extended or adjusted under 35 U.S.C. 154(b) by 273 days.

(21) Appl. No.: 13/102,790

(22) Filed: May 6, 2011

(65) Prior Publication Data

US 2012/0284522 A1    Nov. 8, 2012

(51) Int. Cl.
*H04L 9/32* (2006.01)
*H04N 21/2347* (2011.01)
*H04L 29/06* (2006.01)
*H04N 21/6334* (2011.01)

(52) U.S. Cl.
CPC ........ *H04N 21/2347* (2013.01); *H04L 63/0435* (2013.01); *H04L 65/4084* (2013.01); *H04L 65/605* (2013.01); *H04N 21/6334* (2013.01); *H04L 63/062* (2013.01); *H04L 2463/101* (2013.01)

(58) Field of Classification Search
CPC ..................... H04L 63/0435; H04L 2463/101; H04L 63/062; H04L 65/605; H04L 65/4084; H04N 21/6334; H04N 21/2347; H04N 7/1675; G06F 21/10

USPC .................................................. 713/181, 165
See application file for complete search history.

(56) References Cited

U.S. PATENT DOCUMENTS

| | | | |
|---|---|---|---|
| 7,895,446 B2* | 2/2011 | Harada et al. ................. | 713/185 |
| 2002/0073033 A1* | 6/2002 | Sherr et al. ...................... | 705/51 |
| 2002/0170053 A1* | 11/2002 | Peterka et al. .................. | 725/31 |
| 2010/0257351 A1* | 10/2010 | O'Connor et al. ............ | 713/150 |
| 2011/0126006 A1* | 5/2011 | Dowdy et al. ................. | 713/165 |

OTHER PUBLICATIONS

Study on authentication for live streaming media over P2P-based network, Xinli, Wang IEEE 2009.*
Peer-to-Peer File Resource Sharing System for Mobile Devices, Yang et al, IEEE 2008.*

* cited by examiner

*Primary Examiner* — Luu Pham
*Assistant Examiner* — Jahangir Kabir
(74) *Attorney, Agent, or Firm* — Farjami & Farjami LLP

(57) ABSTRACT

There is provided a method of securing multimedia data for streaming over a network comprising receiving the multimedia data from a server, transforming the multimedia data into secure multimedia data using a security key associated with the multimedia data, storing the security key associated with the multimedia data, streaming the secure multimedia data to the destination server. The method further comprises receiving decoding solution requests associated with the multimedia data from one or more multimedia players for playing the multimedia data and transmitting the security key associated with the multimedia data to each of the multimedia players.

15 Claims, 5 Drawing Sheets

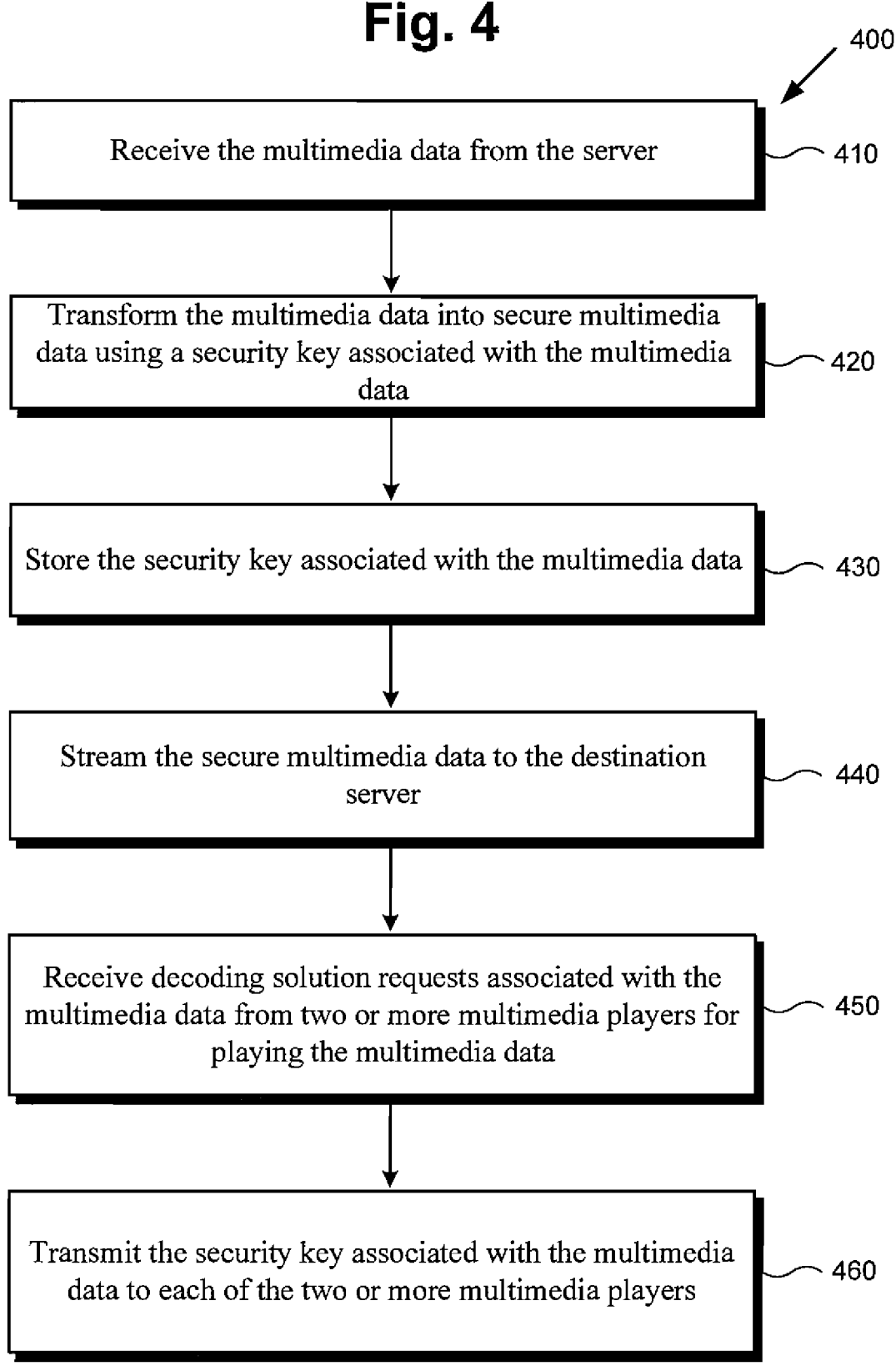

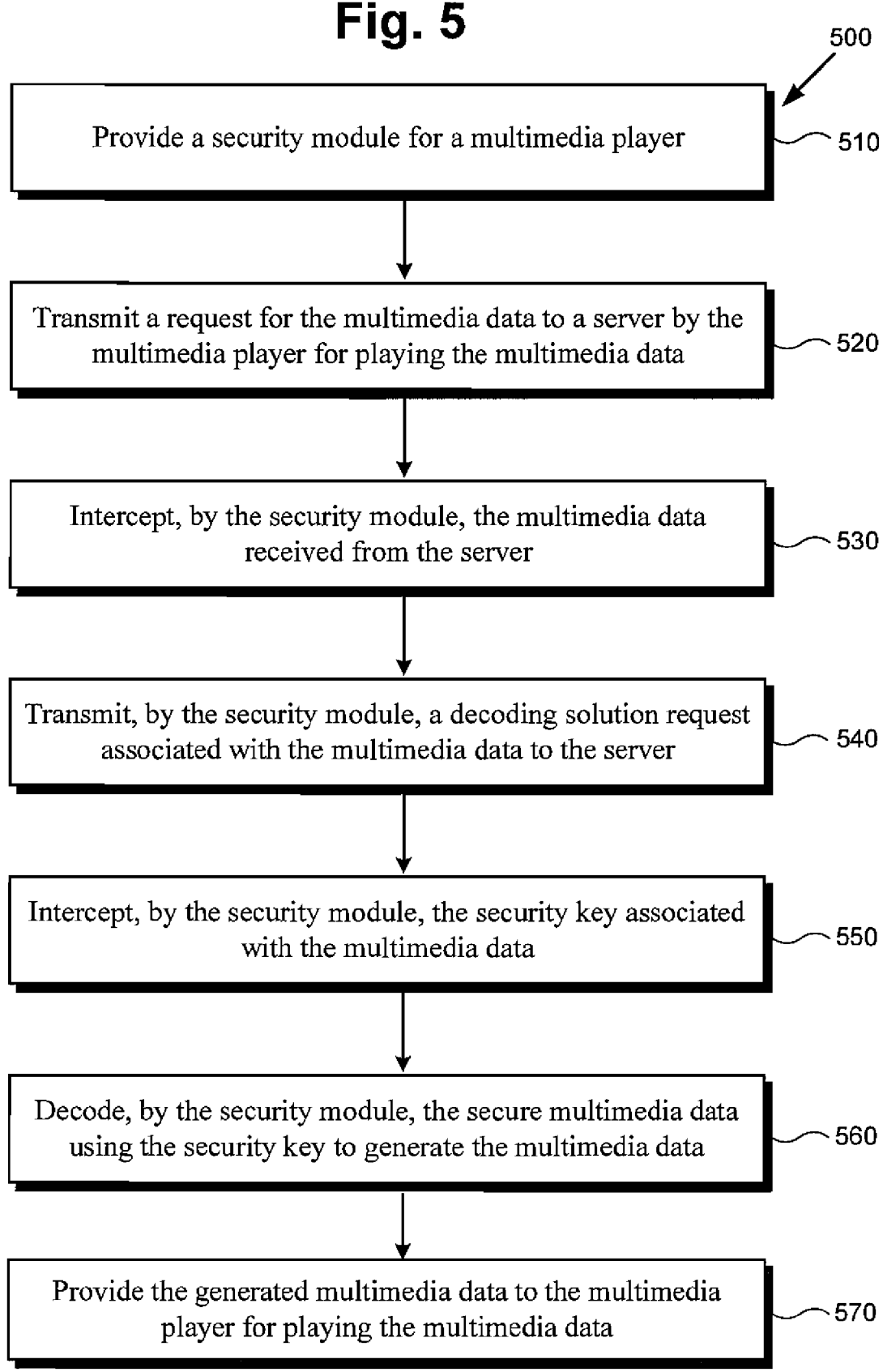

METHOD AND SYSTEM FOR SECURING MULTIMEDIA DATA STREAMED OVER A NETWORK

BACKGROUND OF THE INVENTION

1. Field of the Invention

The present invention relates generally to multimedia data for streaming across a network. More particularly, the present invention relates to securing multimedia data for streaming across a network.

2. Background Art

In our increasingly Internet pervasive society, the streaming of digital information across the Internet has become increasingly pervasive as well. Video streaming websites, such as YouTube, have been accessed by hundreds of millions of users across the globe. As a result of such technological advances, an increasing volume of copyrighted digital multimedia data are being streamed to third parties without the consent of the content owners. Several solutions have been formulated and implemented to deter unauthorized streaming of multimedia data.

One solution used to prevent illegal streaming of digital data is digital rights management (DRM). DRM is padlock technology that restricts how users can download, open, install and copy multimedia data files, such as movie files, music files, and software. DRM solutions may also be used to prevent users from viewing streaming multimedia data from a website. Software applications, such as Adobe Flash Access 2.0, may be used to prevent the displaying of multimedia data from streaming onto an unauthorized computer playback device. For example, when an individual begins streaming a digital movie, created with Adobe Flash Access 2.0, on a website, the website may be prevented from playing digital movie due to restrictions set by the digital movie content distributor. In order to display the streaming multimedia data successfully, the user may be required to acquire a digital access license by verifying the user's identity with DRM verification servers.

DRM not only places restrictions on the playback of streaming multimedia data, but DRM may also restrict which playback devices may stream multimedia data. For example, the streaming or downloaded multimedia data may be played back only through handheld devices but not on desktop personal computers (PCs). Attempting to stream multimedia data onto an unauthorized playback device may require the user to acquire an access license from a DRM verification server.

However, many businesses engaged in the streaming of multimedia data may desire to secure their multimedia data a lesser degree than the security standards set by DRM solutions. For example, a business may desire to allow any visitor to the business's own data website to view streaming multimedia data on the business's website, but the same business may not want unauthorized third-parties from incorporating the business's streaming multimedia data into third-parties' websites. Furthermore, DRM solutions may be too expensive to use for some businesses. For example, a business using Flash Access 2.0 to protect its streaming data may have to purchase and build a Flash Access licensing server and pay Adobe on a per-license issued/per-playback basis.

Thus far, any attempts to secure streaming multimedia data result in overly securing the multimedia data from any user. Accordingly, there is a need to overcome the drawbacks and deficiencies in the art by providing a solution to secure streaming multimedia data without overly burdening a user's access to the streaming multimedia data, and lessening overhead costs on the content providers.

SUMMARY OF THE INVENTION

The method and system for securing multimedia data streamed over a network, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 presents a flowchart describing a method of securing multimedia data for streaming over a network from a server 110, according to one embodiment of the present invention.

FIG. 5 presents a flowchart describing a method of decoding secure multimedia data streamed through network to multimedia player, according to one embodiment of the present invention.

DETAILED DESCRIPTION OF THE INVENTION

The present application is directed to a method and system for securing multimedia data for streaming over a network to a multimedia data player. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
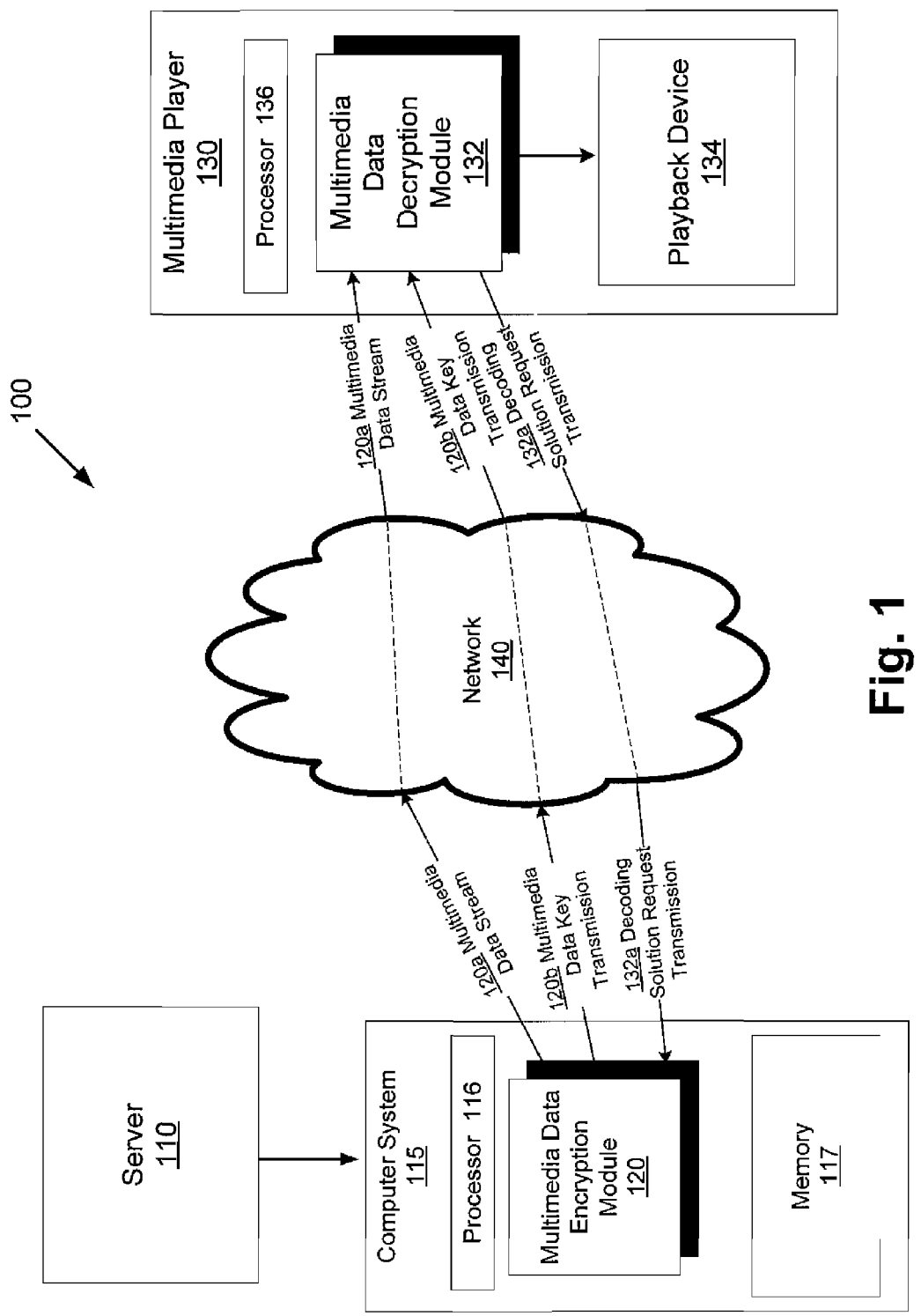
FIG. 1 presents a diagram of an exemplary system for securing multimedia data for streaming over a network, according to one embodiment of the present invention.

FIG. 1 presents a diagram of an exemplary system for securing multimedia data for streaming over a network 140, according to one embodiment of the present invention. In the embodiment of FIG. 1, diagram 100 comprises server 110, computer system 115, multimedia data stream 120a, multimedia data key transmission 120b, network 140, multimedia player 130, and decoding solution request transmission 132a. Computer system 115 includes memory 117, multimedia data encryption module 120, and processor 116 for controlling the operation of computer system 115 and execution of multimedia data encryption module 120. Multimedia player 130 comprises multimedia data decryption module 132, playback device 134 and processor 136 for controlling the operation of multimedia player 130 and execution of multimedia data decryption module 132.

According to one embodiment of the invention as shown in FIG. 1, server 110 may attempt to stream multimedia data to the multimedia player 130 through network 140. In one embodiment of the invention, server 110 may be a multiprocessor server computer. In alternative embodiments of the invention, server 110 may be a handheld device, such as a smartphone, Apple iPad, Apple iPhone, a laptop computer, a desktop personal computer (PC) tablet computer, or any other computing hardware device capable of transmitting multimedia data through network 140. In one embodiment of the invention as shown in FIG. 1, processor 116 may be any hardware device capable of executing applications. Processor 116 may be a central processing unit (CPU), such as an Intel Pentium processing device. In one embodiment of the invention a shown in FIG. 1, memory 117 may be any digital data storage device, such as a random access memory (RAM). In one embodiment of the invention as shown in FIG. 1, network 140 may be a content distribution network. In alternative embodiments of the invention, network 140 may be the Internet, local area network (LAN), wide area network (WAN), virtual private network (VPN), global area network (GAN), content distribution network (CDN), or any other type of network comprising interconnected computing devices. In all instances, network 140 may also follow a wireless setup configuration. Multimedia player 130, in one embodiment of the invention as shown in FIG. 1, may be a multiprocessor server computer. In alternative embodiments of the invention, multimedia player 130 may be a handheld mobile device, such as an Apple iPad, Apple iPhone, a laptop computer, a desktop computer, a PC tablet computer, or any other computing hardware device capable of receiving multimedia data through network 140.

In one embodiment of the invention as shown in FIG. 1, server 110 may be connected to computer system 115, which includes multimedia data encryption module 120. In an alternative embodiment of the invention, server 110 may comprise of multimedia data encryption module 120. Multimedia data encryption module 120 may be a software application used to transform a multimedia data into a secure multimedia data before multimedia data 110 may reach network 140 server 110. Upon receiving multimedia data from server 110, multimedia data encryption module 120 may perform a transformation of the multimedia data. Multimedia data encryption module 120 may employ various cryptographic algorithms to transform and secure a multimedia data. After transforming a multimedia data into a secure multimedia data, multimedia data encryption module 120 may transmit the secure multimedia data through network 140 along multimedia data stream 120*a*. Multimedia data stream 120*a* may be a digital streaming path through network 140 multimedia data may take to reach multimedia player 130.

Prior to reaching multimedia player 130, the secure multimedia data may be intercepted by multimedia data decryption module 132. Upon receiving the secure multimedia data, multimedia data decryption module 132 may send one or more decoding solution requests to multimedia data encryption module 120. The one or more decoding solution requests may follow decoding solution request transmission 132*a* path through network 140 to multimedia data encryption module 120.

Upon receiving the decoding solution request, multimedia data encryption module 120 may perform a legitimacy analysis on the decoding solution request. A legitimacy analysis entails determining whether multimedia player 130 and/or the one or more users using multimedia player 130 may be allowed to unlock and view the actual data contained within the transmitted secured multimedia data.

Legitimacy analysis may yield a determination that multimedia data encryption module 120 may transmit the security key associated with the multimedia data to multimedia player 130. Multimedia data encryption module 120 may transmit the security key using multimedia data key transmission 120*b* through network 140 to multimedia player 130. Upon receiving the security key, multimedia data decryption module 132 may use the key to transform the secure multimedia data back into multimedia data. Multimedia data decryption module 132 may transmit the multimedia data to playback device 134, which may be used to display the multimedia data to user of multimedia player 130.

Figure 2:
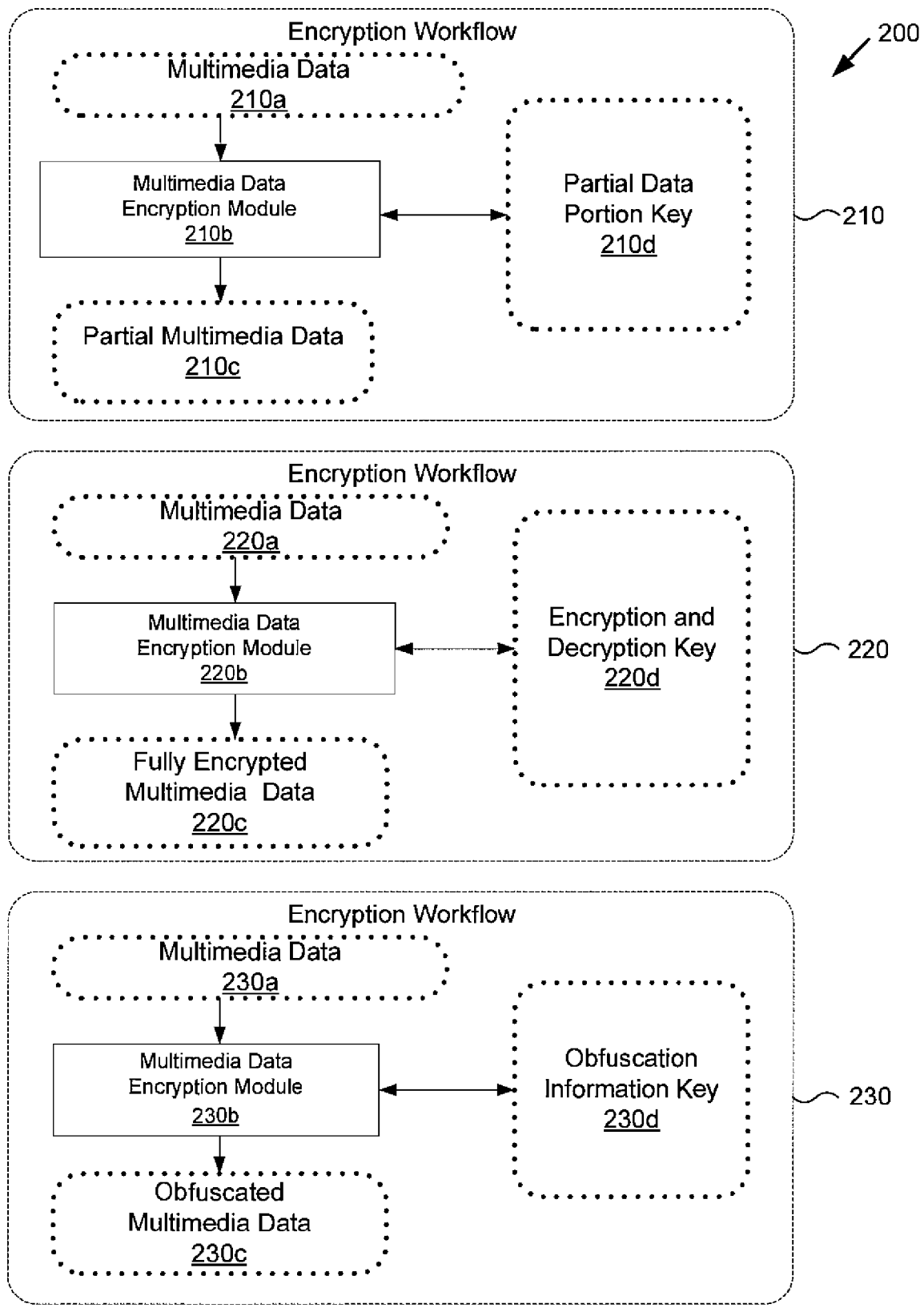
FIG. 2 presents three workflows, each detailing a securing process on a multimedia data, according to one embodiment of the present invention.

Turning now to FIG. 2 and diagram 100 of FIG. 1, FIG. 2 presents three workflows, with each workflow detailing a securing process on a multimedia data 210*a*, 220*a*, and 230*a*, according to one embodiment of the present invention. Diagram 200 of FIG. 2 shows encryption workflow 210, 220, and 230. Encryption workflow 210 includes multimedia data 210*a*, multimedia data encryption module 210*b*, partial multimedia data 210*c*, and partial data portion of multimedia data 210*d*. Encryption workflow 220 includes multimedia data 220*a*, multimedia data encryption module 220*b*, fully encrypted multimedia data 220*c*, and encryption and decryption key 220*d*. Encryption workflow 230 includes multimedia data 230*a*, multimedia data encryption module 230*b*, obfuscated multimedia data 230*c*, and obfuscation information key 230*d*. Multimedia data encryption module 210*b*, 220*b*, and 230*b* may be associated with multimedia data encryption module 120 in FIG. 1.

Encryption workflow 210 shows a process of transforming multimedia data 210*a* into partial multimedia data 210*c*, a type of secure multimedia data. Multimedia data 210*a* may be transmitted into multimedia data encryption module 210*b* from server 110. Multimedia data 210*a* may use a security key to transform the data portions within multimedia data 210*a*. Partial data portion key 210*d* may be a security key. Partial data portion key 210*d*, generated within multimedia data encryption module 210*b*, may direct multimedia data encryption module 210*b* to extract one or more data portions from multimedia data 210*a* and to store the one or more extracted data portions into partial data portion key 210*d*. The remaining data portions of original multimedia data 210*a* may be designated as partial multimedia data 210*c*.

Encryption workflow 220 shows a process of transforming multimedia data 220*a* into fully encrypted multimedia data 220*c*, another type of secure multimedia data. Multimedia data 220*a* may be transmitted into multimedia data encryption module 220*b* from server 110. Encryption and decryption key 220*d* may be a security key used to transform multimedia data 220*a*. Encryption and decryption key 220*d*, generated within multimedia data encryption module 220*b*, may direct multimedia data encryption module 220*b* to encrypt multimedia data 220*a* into fully encrypted multimedia data 220*c*. In alternative embodiments of the invention, encryption and decryption key 220*d* may encrypt multimedia data 220*a* partially. In one embodiment of the invention as shown in FIG. 2, encryption and decryption key 220*d* contains both the encryption algorithm and the decryption algorithm associated with the encryption algorithm.

Encryption workflow 230 shows the transformation of multimedia data 230*a* into obfuscated multimedia data 230*c*, another type of secure multimedia data. Multimedia data 230*a* may be transmitted into multimedia data encryption module 230*b* by server 110. Multimedia data 230*a* may use a security key in order to transform the data portions within multimedia data 230a. Obfuscation information key 230d, generated within multimedia data encryption module 230b, may be a security key used to secure multimedia data 230a. Obfuscation information key 230d may direct multimedia data encryption module 230b to transform multimedia data 230a into obfuscated multimedia data 230c.

Multimedia data 210a, 210b, and 210c may be complete data files, or a portion of the complete data file. The security key used to transform multimedia data 210a, 210b and 210c into secure multimedia data may also contain information associating the security key to the multimedia data 210a, 210b, and 210c.

Figure 3:
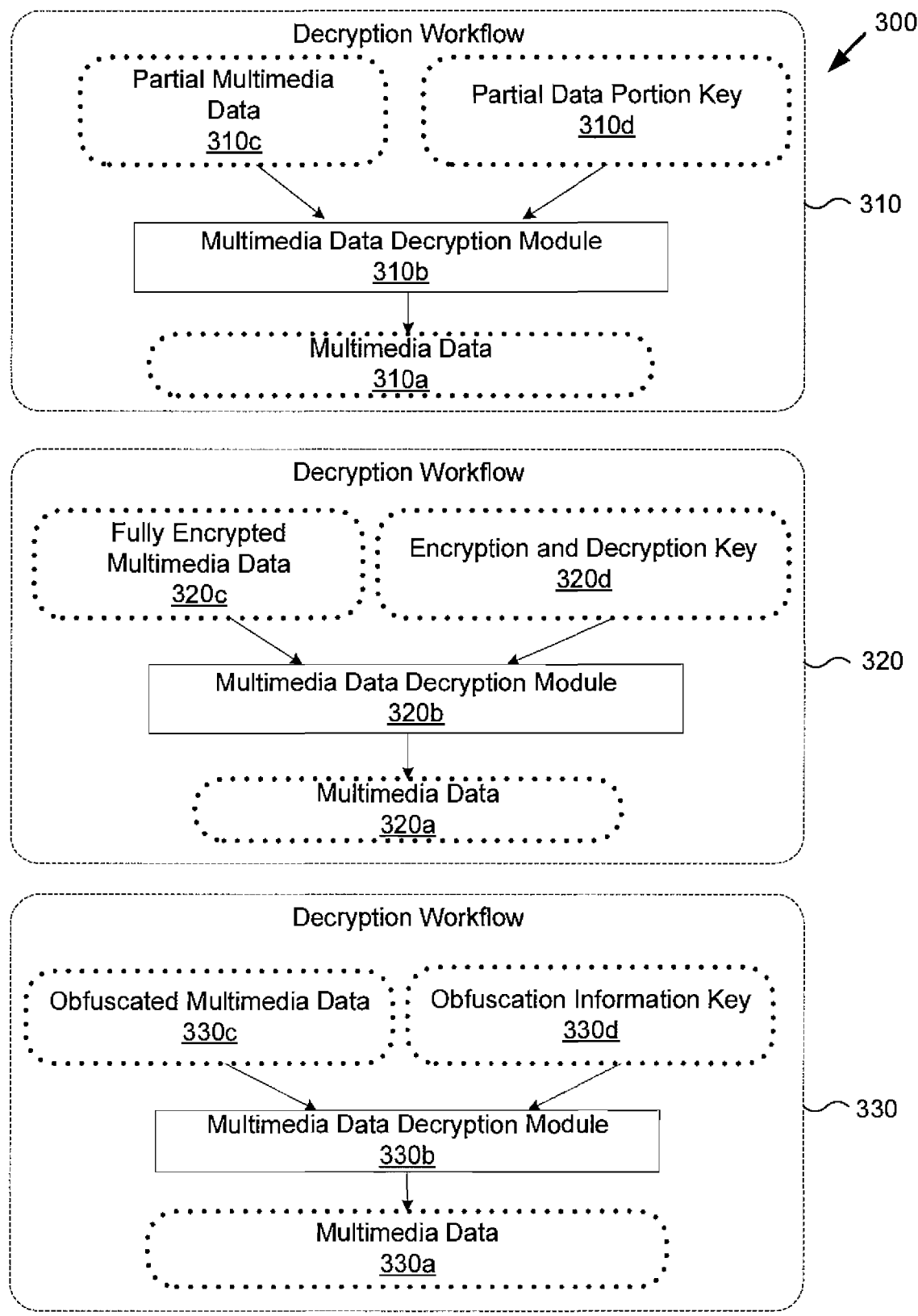
FIG. 3 presents three workflows, each detailing a decryption process on a secure multimedia data, according to one embodiment of the present invention.

Turning to FIG. 3 and diagram 100 of FIG. 1, FIG. 3 presents three workflows, with each workflow detailing a decryption process on a secure multimedia data, according to one embodiment of the present invention. Diagram 300 in FIG. 3 includes decryption workflow 310, 320, and 330. Decryption workflow 310 includes partial multimedia data 310c, partial data portion key 310d, multimedia data decryption module 310b, and multimedia data 310a. Decryption workflow 320 includes fully encrypted multimedia data 320c, encryption and decryption key 320d, multimedia data decryption module 320b, and multimedia data 320a. Decryption workflow 330 includes obfuscated multimedia data 330c, obfuscation information key 330d, multimedia data decryption module 330b, and multimedia data 330a. Multimedia data decryption module 310b, 320b, and 330b may be associated with multimedia data decryption module 132.

Decryption workflow 310 shows multimedia data decryption module 132. receiving multimedia data 310c and partial data portion key 310d, both transmitted from network 140. Using partial data portion key 310d, multimedia data decryption module 310b may restore the missing data portions from partial data portion key 310d into partial multimedia data 310c to transform partial multimedia data 310c into multimedia data 310a.

Decryption workflow 320 shows multimedia data decryption module 320b receiving fully encrypted multimedia data 320c and encryption and decryption key 320d, both transmitted from network 140. Using encryption and decryption key 320d, multimedia data decryption module 320b may transform fully encrypted multimedia data 320c into multimedia data 320a.

Decryption workflow 330 shows multimedia data decryption module 330b receiving obfuscated multimedia data 330c and obfuscation information key 330d, both transmitted from network 140. Using obfuscation information key 330d, multimedia data decryption module 330b may reverse the obfuscation process used to create obfuscated multimedia data 330, and transform obfuscated multimedia data 330 into multimedia data 330a.

The present invention will now be further described by FIGS. 4 and 5, which present exemplary methods of securing multimedia data for streaming over a network. Certain details and features have been left out of flowcharts 400 and 500 that are apparent to a person of ordinary skill in the art. For example, a step may consist of one or more substeps or may involve specialized equipment or materials, as known in the art. While steps 410 through 460, in FIG. 4, and 510 through 570, in FIG. 5, are sufficient to describe particular embodiments of the present method, other embodiments may utilize steps different from those shown in flowcharts 400 and 500, or may include more, or fewer steps.

Beginning with FIG. 4 and diagram 100 in FIG. 1, FIG. 4 presents a flowchart 400 describing a method of securing multimedia data for streaming over a network from a server 110, according to one embodiment of the present invention. Step 410 of flowchart 400 comprises receiving the multimedia data from the server 110. In one embodiment of the invention as shown in FIG. 1, multimedia data encryption module 120 may be configured to receive complete data files or fragments of data files.

In an alternative embodiment of the invention, multimedia data encryption module 120, during the occurrence of step 410, may also determine which security key multimedia data encryption module 120 may use at a later step of flowchart 400 to transform a multimedia data into secure multimedia data. There may be a set time period during which only one type of security key may be used to transform multimedia data into secure multimedia data. After the expiration of the time period, another type of security key may be used to transform multimedia data into secure multimedia data. For example, for a time period of 10 minutes, multimedia data encryption module 120 may only use encryption and decryption key to secure incoming multimedia data from server 110. After the 10 minute time period passes, a different encryption and decryption key may be used to encrypt incoming multimedia data, or a new obfuscation information key, corruption key, partial data portion key, or any type of key may be used as well for another set time period of 10 minutes. In yet other embodiments of the invention, multimedia data encryption module 120 may be configured to receive a security key from server 110, as opposed to generating a security key. The selection of the security key may not depend on any particular user and the security keys may be generated randomly. In yet another embodiment of the invention, multimedia data encryption module 120 may be configured to use only one security key for the transformation of any multimedia data into secure multimedia data.

The exemplary method of flowchart 400 continues with step 420, which comprises transforming the multimedia data into secure multimedia data using a security key associated with the multimedia data received from step 410. Multimedia data encryption module 120 may transform multimedia data into secure multimedia data.

In various embodiments of the invention as shown in FIG. 1, multimedia data encryption module 120 may use various types of security keys. One type of security key may be an encryption and decryption key. Encryption may be commonly understood as digital manipulation of data portions within multimedia data according to an algorithm such that the encrypted multimedia data may no longer be capable of being comprehensible to playback device 134. Another type of security key may contain an obfuscation algorithm, which may digitally manipulate data portions within multimedia data. Obfuscated multimedia data may be capable of being displayed through playback device 134, but the displayed obfuscated multimedia data may be incomprehensible to users. Another type of security key may direct multimedia data encryption module 132 to extract one or more data portions from multimedia data at fixed or random locations within the multimedia data, and to store those extracted data portions into the security key, which may become a repository for storing one or more extracted data portions.

As another example, a security key may include a data corruption algorithm, which may insert additional unnecessary data into multimedia data. Such unnecessary data may corrupt the multimedia data to such a manner that the multimedia data may not be recognizable to multimedia player 130. In, yet, other embodiments of the invention as shown in FIG. 4, step 420 may utilize other types of security keys that alters or manipulates the multimedia data in such a manner as to transform the multimedia data into unplayable data to multimedia player 130 or incomprehensible data to users.

In one embodiment of the invention as shown in FIG. 1, server 110 may send multiple copies of the same piece of multimedia digital data to computer system 115 for encoding. For example, when server 110 transmits a digital video data multiple times to the same media player 130 or to various destination servers, multimedia data encryption module 120 may encode each instance of the digital video data using the same security key. As a result, numerous instances of the same encoded digital video data may be transmitted to one or more destination servers. The same security key used to encode numerous instances of the same digital video data may then be used to decode the numerous instances of the same digital video data on the one or more destination servers. Therefore, users requesting the same multimedia digital data may get the same encoded multimedia digital data and the same security key may be sent to all of those users to decode the encoded multimedia digital data.

In one embodiment, for security reasons, the media content might be repeatedly re-encrypted and new keys generated as a mitigation factor for compromised keys or files or as a preemptive measure at certain time intervals. The locations for the media content and the key would remain the same, so clients would not need to update the URL for content or keys.

Flowchart 400 continues with step 430, which comprises storing the security key associated with the multimedia data into memory. The security key used to transform a multimedia data into a secure multimedia data in step 420 may be stored into memory on a memory storage device determined by multimedia data encryption module 120. Digital data may also be added into the security key to ensure that the security key may be associated with both multimedia data and secure multimedia data.

Flowchart 400 continues with step 440, which comprises streaming the secure multimedia data to the destination server through network 140. The secure multimedia data acquired after step 420 may now be transmitted through network 140 to a destination server or a destination serve, such as multimedia player 130. The destination server may be any type of hardware device capable of receiving and playing back multimedia data.

Step 450 of flowchart 400 comprises receiving decoding solution requests associated with the multimedia data from two or more multimedia players for playing the multimedia data. After the secure multimedia data in step 440 has been streamed to multimedia player 130, multimedia data decryption module 132 may send one or more decoding solution requests to multimedia data encryption module 120 in order to seek the security key associated with secure multimedia data. Multimedia data encryption module 120 may access memory storage and look for the security key associated with the secure multimedia data. Upon finding the one or more security keys associated with the secure multimedia data, multimedia data encryption module 120 may transmit the one or more security keys through network 140 to multimedia player 130.

In an alternative embodiment of the invention as shown in FIG. 4, multimedia data encryption module 120 may perform a legitimacy analysis on multimedia player 130 sending the decoding solution requests. In one embodiment of the invention as shown in FIG. 4, legitimacy analysis may include determining whether multimedia player 130 may be allowed to receive the security key from multimedia data encryption module 120. Factors such as the location of multimedia player 130 may need to be provided to multimedia data encryption module 120 before transmission of any security keys. Legitimacy analysis may also include determining whether the user(s) of multimedia player 130 may be allowed to receive the security key. In order to verify that the users of multimedia player 130 are legitimate users, legitimacy analysis may request additional data, such as name, place of birth, birthday, or other personal and/or unique information associated with the users, from the user of multimedia player 130 by sending such requests to the user through network 140.

The final step 460 of flowchart 400 comprises transmitting the security key associated with the multimedia data to each of the two or more multimedia players. After receiving the decoding solution request in step 450, multimedia data encryption module 120 may decide to transmit the security key to multimedia player 130. The security key selected may be determined by the digital information stored within decoding solution request received by multimedia data encryption module 120.

Moving now to FIG. 5 and diagram 100 in FIG. 1, FIG. 5 presents a flowchart 500 describing a method of decoding secure multimedia data for streamed through network 140 to multimedia player 130, according to one embodiment of the present invention. Step 510 of flowchart 500 comprises providing a security module for multimedia player 130. In one embodiment of the invention as shown in FIG. 1, multimedia data decryption module 132 may be a software application stored within multimedia player 130. In another embodiment of the invention, the security module may be another software application executing within multimedia data decryption module 132.

The exemplary method of flowchart 500 continues with step 520, which comprises transmitting a request for the multimedia data to server 110 by multimedia player 130 for playing the multimedia data. Multimedia data decryption module 132 may use the security module, provided in step 510, to transmit requests to server 110 seeking multimedia data.

Flowchart 500 continues with step 530, comprising intercepting, by the security module, the multimedia data received from the server. After transmitting a request for the multimedia data in step 520, security module within multimedia data decryption module 132 may continuing to process other incoming secure or unsecure multimedia data. Before the secured or unsecured multimedia data reaches multimedia player 130, the security module may intercept the multimedia data.

Step 540 of flowchart 500 comprises transmitting, by the security module, a decoding solution request associated with the multimedia data to the server 110. Upon receiving the multimedia data in step 540, multimedia data decryption module 132 may determine that multimedia data may be secured and unusable by multimedia player 130 and/or incomprehensible to users. As a result of receiving secure multimedia data, multimedia data decryption module 132 may use security module to transmit one or more decoding solution requests associated with secure multimedia data through network 140 to multimedia data encryption module 120. In one embodiment of the invention as shown in FIG. 1, each decoding solution request contains a request for a unique security key or a unique type of security key. In another embodiment of the invention, each decoding solution request may contain digital data specifying the secure multimedia data associated with the decoding solution request. In alternative embodiments of the invention, decoding solution request may contain any other additional information in order to assist multimedia data encryption module 120 in selecting the proper security key. In yet, other embodiments of the invention, decoding solution request may contain user identification information and/or multimedia player 130 identification information.

Continuing with step 550 of flowchart 500, step 550 comprises intercepting, by the security module, the security key associated with the multimedia data. After transmitting to server 110 one or more decoding solution requests, security module may be ready to intercept the transmission of security key from server 110. Any security key from network 140 to multimedia player 130 may be intercepted by security module within multimedia data decryption module 132.

Step 560 of flowchart 500 comprises decoding, by the security module, the secure multimedia data using the security key to generate the multimedia data. The secure multimedia data received by security module in step 530 may now be decoded by security module with the security key from step 550. The security key may be used to reverse the security process performed on the multimedia data by multimedia data encryption module 120.

The security key may contain the algorithm and/or digital data portions for restoring secure multimedia data into multimedia data. For example, the encryption and decryption key may contain the encryption algorithm and the corresponding decryption algorithm. The obfuscation information key contain may contain the algorithm used to created the obfuscation. Corruption information key may contain information locating the data inserted into multimedia data. Partial data portion key may contain the data portion extracted from multimedia data.

The final step 570 of flowchart 500 comprises providing the multimedia data generated in step 560 to the multimedia player 130 for display, execution, or other purposes. After step 560, multimedia data may be usable by multimedia player 130 and/or comprehensible by users. Therefore, security module may be configured to deliver the multimedia data to multimedia player 130 or to other playback devices.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method of securing multimedia data by a computer having a hardware processor and a non-transitory memory for streaming over a network, the method comprising:
   receiving, using the hardware processor, the multimedia data from a server;
   transforming, using the hardware processor, the multimedia data into secure multimedia data using a security key associated with the multimedia data, the security key having a validity time period;
   storing, using the hardware processor, the security key associated with the secure multimedia data in the non-transitory memory;
   streaming, using the hardware processor, the secure multimedia data to two or more multimedia players, wherein each of the two or more multimedia players includes a multimedia decryption module and a playback device;
   receiving, using the hardware processor, in response to the streaming of the secure multimedia data, decoding solution requests associated with the secure multimedia data from the two or more multimedia players for playing the multimedia data, wherein the decoding solution requests include information for selecting the security key associated with the secure multimedia data;
   receiving a location information of each of the two or more multimedia players and an identity information of each user of the two or more multimedia players;
   performing, using the hardware processor, a legitimacy analysis on the decoding solution requests, wherein the legitimacy analysis comprises a verification of the location information and the identity information; and
   in response to a successful verification (a) of the location information and the identity information of each of the two or more multimedia players, and (b) that the validity time period of the security key has not expired;
   retrieving the security key from the non-transitory memory; and
   transmitting, using the hardware processor, the security key associated with the secure multimedia data to each of the two or more multimedia players for use by the multimedia decryption module of the two or more multimedia players to convert back the secure multimedia data into the multimedia data.

2. The method of claim 1, wherein the security key comprises an encryption and decryption key associated with one or more data portions of the multimedia data.

3. The method of claim 1, wherein the transforming the multimedia data comprises extracting one or more data portions from the multimedia.

4. The method of claim 3, wherein the transmitting comprises transmitting the security key and the one or more data portions from the multimedia data.

5. The method of claim 1, wherein the security key comprises a data obfuscation information.

6. The method of claim 1, wherein the security key comprises a data corruption information.

7. The method of claim 1, further comprising selecting the security key from one or more security keys prior to transforming the multimedia data.

8. The method of claim 1, further comprising adding digital data to the security key for associating the security key with both the multimedia data and the secure multimedia data prior to the storing of the security key in the memory, wherein the information used to select the security key specifies the secure multimedia data.

9. A computer system for securing multimedia data for streaming over a network, the system comprising:
   a non-transitory memory; and
   a hardware processor configured to:
   receive the multimedia data from a server;
   transform the multimedia data into secure multimedia data using a security key associated with the multimedia data, the security key having a validity time period;
   store the security key associated with the secure multimedia data in the non-transitory memory;
   stream the secure multimedia data to two or more multimedia players, wherein each of the two or more multimedia players includes a multimedia decryption module and a playback device;
   receive, in response to the streaming of the secure multimedia data, decoding solution requests associated with the secure multimedia data from the two or more multimedia players for playing the multimedia data, wherein the decoding solution requests include information for selecting the security key associated with the secure multimedia data;

receive a location information of each of the two or more multimedia players and an identity information of each user of the two or more multimedia players;

perform a legitimacy analysis on the decoding solution requests, wherein the legitimacy analysis comprises a verification of the location information and the identity information; and in response to a successful verification (a) of the location information and the identity information of each of the two or more multimedia players, and (b) that the validity time period of the security key has not expired:

retrieve the security key from the non-transitory memory; and transmit, the security key associated with the secure multimedia data to each of the two or more multimedia players for use by the multimedia decryption module of the two or more multimedia players to convert back the secure multimedia data into the multimedia data.

10. The system of claim 9, wherein the security key comprises an encryption and decryption key associated with one or more data portions of the multimedia data.

11. The system of claim 9, wherein the transforming the multimedia data comprises extracting one or more data portions from the multimedia.

12. The system of claim 11, wherein the processor is further configured to transmit comprises to transmit the security key and the one or more data portions from the multimedia data.

13. The system of claim 9, wherein the security key comprises a data obfuscation information.

14. The system of claim 9, wherein the security key comprises a data corruption information.

15. The system of claim 14, wherein the processor is further configured to select the security key from one or more security keys prior to transform the multimedia data.

* * * * *